(12) United States Patent
Johnson et al.

(10) Patent No.: US 6,181,283 B1
(45) Date of Patent: *Jan. 30, 2001

(54) SELECTIVELY REMOVABLE COMBINATION BATTERY AND ANTENNA ASSEMBLY FOR A TELECOMMUNICATION DEVICE

(75) Inventors: Greg Johnson, Aptos; Norval N. Luxon, South San Francisco, both of CA (US)

(73) Assignee: RangeStar Wireless, Inc., Aptos, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/253,491

(22) Filed: Feb. 19, 1999

Related U.S. Application Data

(63) Continuation-in-part of application No. 08/549,063, filed on Oct. 27, 1995, now Pat. No. 6,095,820, which is a continuation-in-part of application No. 08/480,905, filed on Jun. 8, 1995, now Pat. No. 5,666,125, which is a continuation-in-part of application No. 08/283,526, filed on Aug. 1, 1994, now Pat. No. 5,507,012.

(51) Int. Cl.[7] ........................................ H01Q 1/24
(52) U.S. Cl. ................... 343/702; 343/700 MS; 343/767; 343/793

(58) Field of Search .............................. 343/702, 700 MS, 343/767, 793, 795, 895; 455/90; H01Q 1/24

(56) References Cited

U.S. PATENT DOCUMENTS

| | | | | |
|---|---|---|---|---|
| 4,903,326 | * | 2/1990 | Zakman et al. | 343/702 |
| 5,335,366 | * | 8/1994 | Daniels | 343/841 |
| 5,649,306 | * | 7/1997 | Vannatta et al. | 455/575 |
| 5,945,954 | * | 8/1999 | Johnson | 343/702 |

FOREIGN PATENT DOCUMENTS 7-321688 * 8/1995 (JP) ................................ H01Q/1/24

* cited by examiner

*Primary Examiner*—Hoanganh Le
(74) *Attorney, Agent, or Firm*—Larkin, Hoffman, Daly & Lindgren, Ltd.; John F. Klos

(57) ABSTRACT

For a wireless telecommunication device, such as a cellular telephone or PCS device, a combined battery pack assembly and antenna assembly for selective detachment therewith. The combined assembly is removably attached to the phoneset member of the wireless communication device. The combined assembly is intended to be selectively removed and subsequently re-attached to the phoneset member. The antenna assembly may be positioned on the removable assembly near the upper portion thereof, and away from user contact during intended operation.

24 Claims, 8 Drawing Sheets

SELECTIVELY REMOVABLE COMBINATION BATTERY AND ANTENNA ASSEMBLY FOR A TELECOMMUNICATION DEVICE

CROSS REFERENCE TO RELATED APPLICATIONS

This application is a continuation-in-part of application Ser. No. 08/549,063, filed Oct. 27, 1995, now U.S. Pat. No. 6,095,820, filed Aug. 1, 2000, which is a continuation-in-part of 08/480,905, filed Jun. 8, 1995, now U.S. Pat. No. 5,666,125, which is a continuation-in-part of application Ser. No. 08/283,526, filed Aug. 1, 1994, now U.S. Pat. No. 5,507,012.

FIELD OF THE INVENTION

The present invention relates to radio communication devices such as cellular telephones and PCS devices and, more particularly, to a selectively removable combined battery pack and antenna assembly for use with such devices.

DESCRIPTION OF THE PRIOR ART

Radio transmission from a portable wireless devices, such as a cellular telephone or PCS device, is accomplished through an antenna or antenna structure. A variety of antenna structures are known, and include dipole, helical, patch, and other variants. Antenna structures have been disposed on the handset body and have not typically been designed for selective removal from the handset. Typically, antenna structures are disposed on a handset of the portable wireless device and are not intended to be removed or released away from the handset body. As a result, in the normal course of user operation the antenna structure remains attached to a handset of the wireless device. Wireless communications devices also include a battery assembly for cord-free operation. Rechargeable battery packs which are releasable away from the handset are also known, and permit battery recharging apart from the communication device. In the past, the rechargeable battery pack and antenna structure have been separately and discretely disposed on or relative to the handset. For example, selective release of the battery pack away from a typical handset would not disrupt the positional relationship between the antenna structure and the handset.

SUMMARY OF THE INVENTION

One aspect of the present invention provides an antenna structure which is disposed within or upon a selectively removable or detachable assembly of the communication device. The selectively releasable portion may be a rechargeable battery assembly of the communication device. A coupling device operatively couples the battery assembly and the antenna assembly to the communication device. The coupling device may include a separate coax coupler and one or more dc coupling contact structures. Alternatively, the coupling device may include a combined rf and dc coupling structure, for instance a coax line with a dc blocking componentry. The inventive antenna assembly can be used for hand-held communication devices, such as cellular telephones, PCS devices, or any other radio communication system.

Another aspect of the present invention provides a particular antenna structure which is disposed upon a removable battery assembly of an associated radio communication device. The antenna structure may include a displaceable active element, which may be supported by a movable support element and which may be pivoted into its operational orientation relative to the removable battery assembly.

Another aspect of the present invention provides a patch antenna structure which is disposed upon a removable battery assembly of an associated radio communication device. The patch antenna may be disposed at an upper portion of the removable battery assembly and away from a user's hand during intended operation of the radio communication device.

Another aspect of the present invention provides a slot antenna structure which is disposed upon a removable battery assembly of an associated radio communication device. The slot antenna may be disposed at an upper portion of the removable battery assembly and away from a user's hand during intended operation of the radio communication device.

Yet another aspect of the present invention provides a combined antenna and battery assembly, housed within a structure for releasable securement to the phoneset of the wireless device, wherein the antenna assembly is positioned near an upper portion of the releasable securement structure and the battery assembly is positioned near a lower portion of the releaseable securement structure.

Still other objects and advantages of the present invention and methods of construction of the same will become readily apparent to those skilled in the art from the following detailed description, wherein preferred embodiments are shown and described, simply by way of illustration of the best mode contemplated of carrying out the invention. As will be realized, the invention is capable of other and different embodiments and methods of construction, and its several details are capable of modification in various obvious respects, all without departing from the invention.

DETAILED DESCRIPTION OF THE INVENTION

Figure 1:
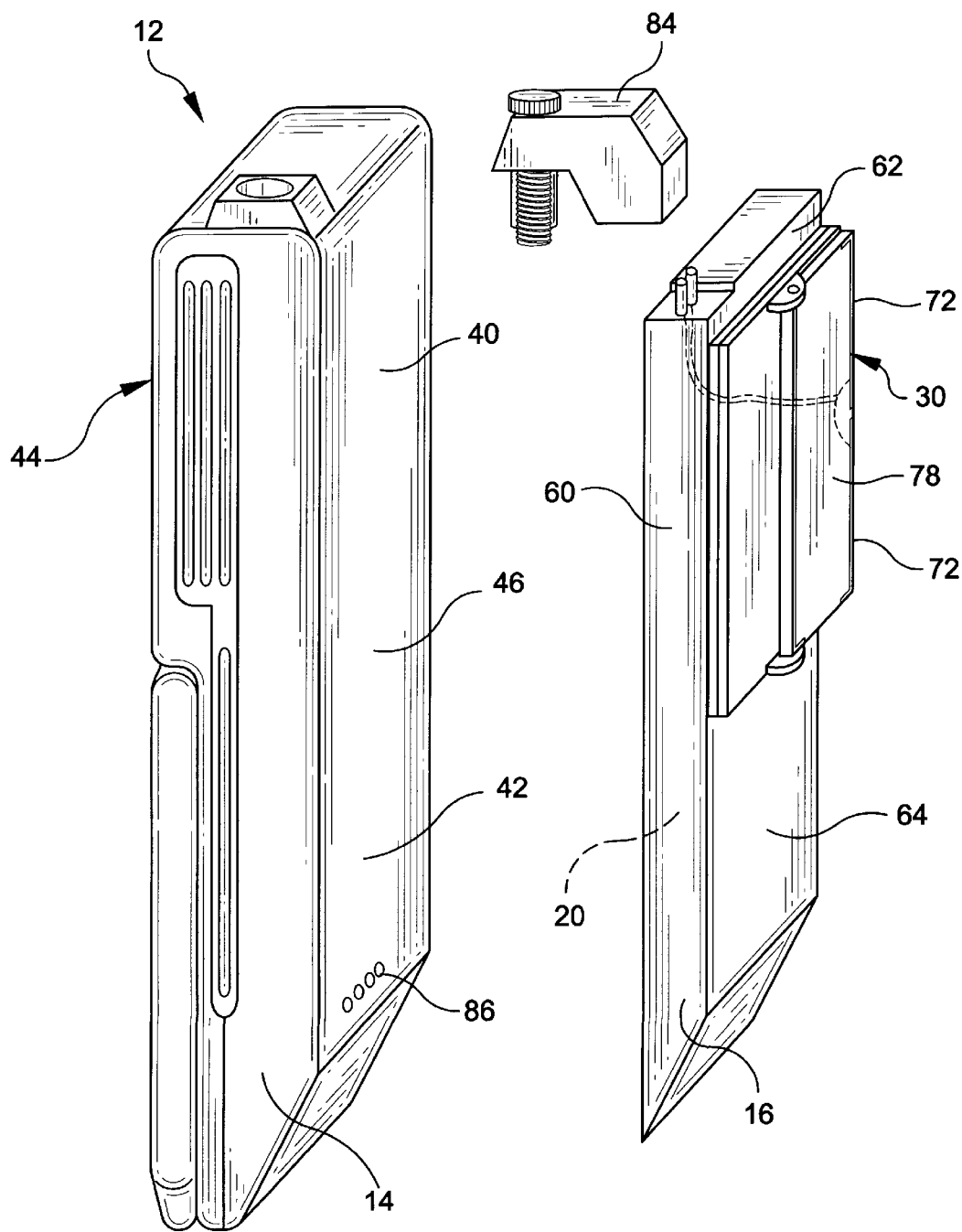
FIG. 1 is a perspective view of a wireless communication device according to the present invention, illustrating the combined battery and antenna assembly disassociated from the handset member.

For describing the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated devices, and such further applications of the principles of the invention as disclosed herein, as would normally occur to one skilled in the art to which the invention pertains.

Figure 2:
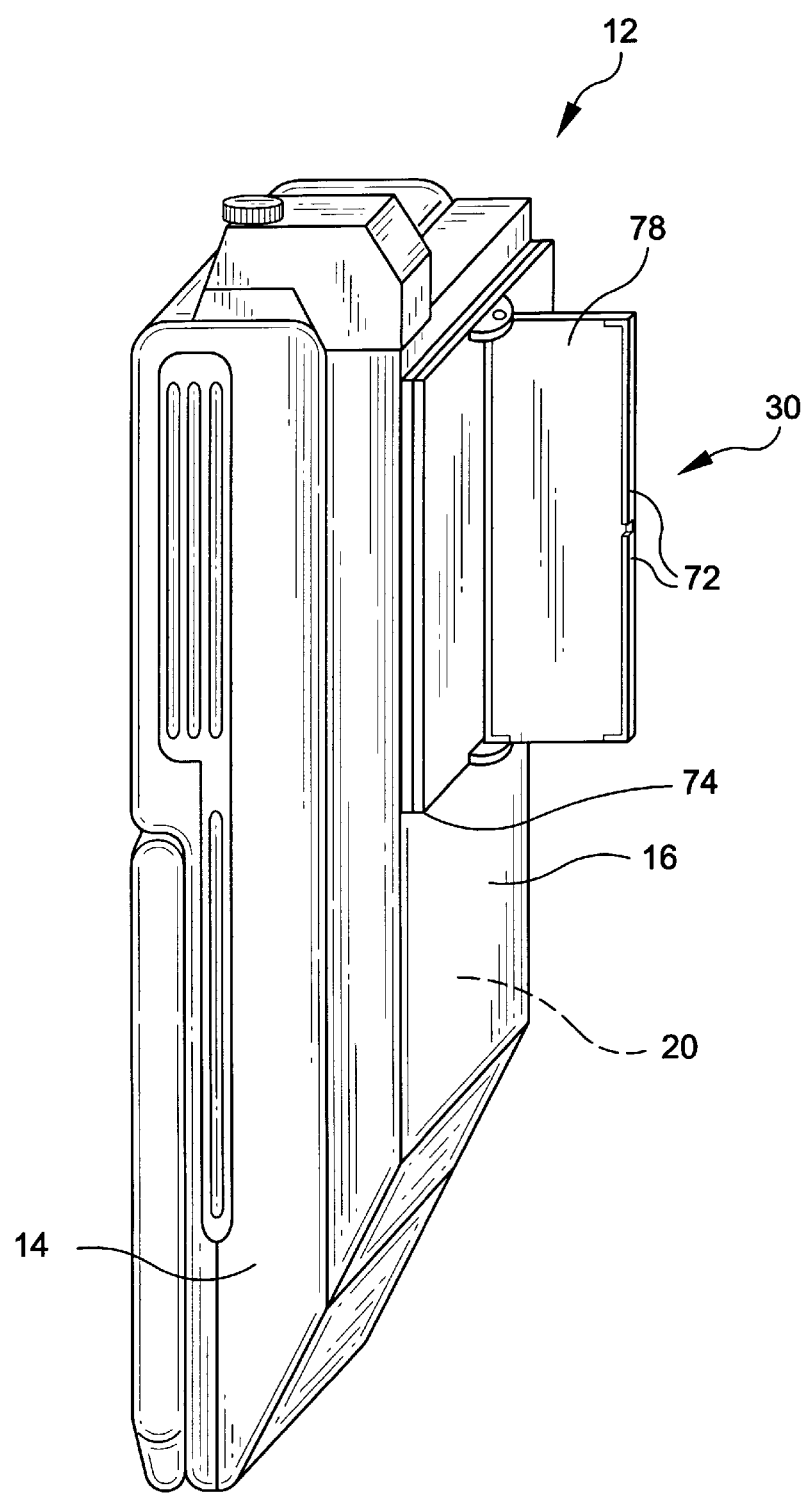
FIG. 2 is a perspective view of the wireless communication device of FIG. 1, illustrating the combined battery and antenna assembly operatively associated with the handset member.

Referring to drawings, a wireless communication device 12 is shown in FIGS. 1 and 2. The wireless communication device 12 may be a cellular telephone, PCS handset, handheld radio, or the like. Wireless communication device 12 includes a phoneset member 14 and a detachable assembly 16 permitting selective user disassociation relative to the phoneset member 14. The word 'detachable' as used herein is broadly defined as: capable of being detached, separated, disconnected, unfastened, or removed from association. Detachable assembly 16 includes a battery component 20 for a phoneset 14 power source and an antenna assembly 30 for transmitting a radio signal from the phoneset member 14. FIG. 1 is a perspective view of a disassociated wireless communication device 12 showing phoneset member 14 and detachable assembly 16 removed from one another. FIG. 2 is a perspective view of the assembled wireless communication device 12 of FIG. 1, depicted as during use, with the combined phoneset member 14 and detachable assembly 16

Phoneset member 14 of the illustrated wireless communication device 12 includes a top portion 40 and a lower portion 42. An earpiece structure 44 for emitting sound to a user's ear is disposed at the top portion 40 of the phoneset member 14. It is recognized that even though one particular phoneset 14 is described herein and illustrated in the drawings, phoneset member 14 may be selected from among the variety of known phoneset members.

As shown in FIG. 2, detachable assembly 16 is disposed at a back surface 46 of the phoneset member 14. Detachable assembly 16 includes a body member 60 which has an upper portion 62 and a lower portion 64. In the illustrated associative embodiment of FIG. 2, the upper portion 62 and lower portion 64 of the detachable assembly 16 coincide with the upper portion 40 and lower portion 42, respectively, of the associated phoneset member 14. Detachable assembly 16 may be selectively and releaseably secured to the back surface 46 of the phoneset member 14 through appropriate securing structure (not shown), including, for example, a latch or detent structure, or other known selectively releasable securing mechanisms.

Detachable assembly 16 further includes an antenna assembly 70 for transmitting a radio signal and a battery component 20 providing the power source for the wireless communication device 12. An antenna coupling structure 84 is used to operatively couple the antenna assembly 70 to the phoneset 14 when the detachable assembly 16 is combined with the phoneset member 14 as illustrated in FIG. 2. The antenna coupling structure 84 of FIGS. 1 and 2 is a retrofit coupler, which permits use of the combined detachable battery pack and antenna assembly 16 with wireless communication devices 12 having whip-style antennas. A battery coupling structure 86 of FIGS. 1 and 2 is two or more electric contacts. Any appropriate antenna and battery coupling structures 84, 86 may be used, including, for example, a flat contact structure and a coax connection structure. Integrated coupling structures (not shown) for coupling an rf signal and dc are known (for instance, a coax line with dc blocking componentry) and may be applicable to practice the invention.

In the embodiment shown in FIGS. 1 and 2, the antenna assembly 70 includes a two-part dipole element 72 and a ground plane element 74. The dipole antenna member 72 is formed of a thin conductive material. The ground plane 74 is a thin conductive panel. Other embodiments of an antenna assembly 70 include a double-sided printed circuit board having a metal layer forming the dipole antenna element 72. A range of conductive materials, such as metal foils and wires, conductive polymers, etc., can be utilized to implement the dipole antenna member element 72. Similarly, the ground plane element 74 may be a discrete conductive panel, a portion of the ground plane of the transceiver electronics, or a metallic portion of the battery pack. To reduce the size of the antenna assembly 70, one or more dielectric layers 76 may be disposed between the ground plane 74 and the dipole element 72.

As shown in FIGS. 1 and 2, the dipole element 72 of the antenna structure 70 is disposed upon a movable support member 78. The support member 78 is secured with pivotal mounts so as to allow it to be stowed nearer to the back of the wireless communication device 12 when not in use (as depicted in FIG. 1).

As illustrated in FIGS. 1 and 2, the battery assembly 20 is disposed within the detachable assembly 16. Battery assembly 20 may include one or more rechargeable batteries. Battery assembly 20 is disposed, as illustrated in FIGS. 1 and 2, at the lower portion 62 of the detachable assembly 16.

Figure 3:
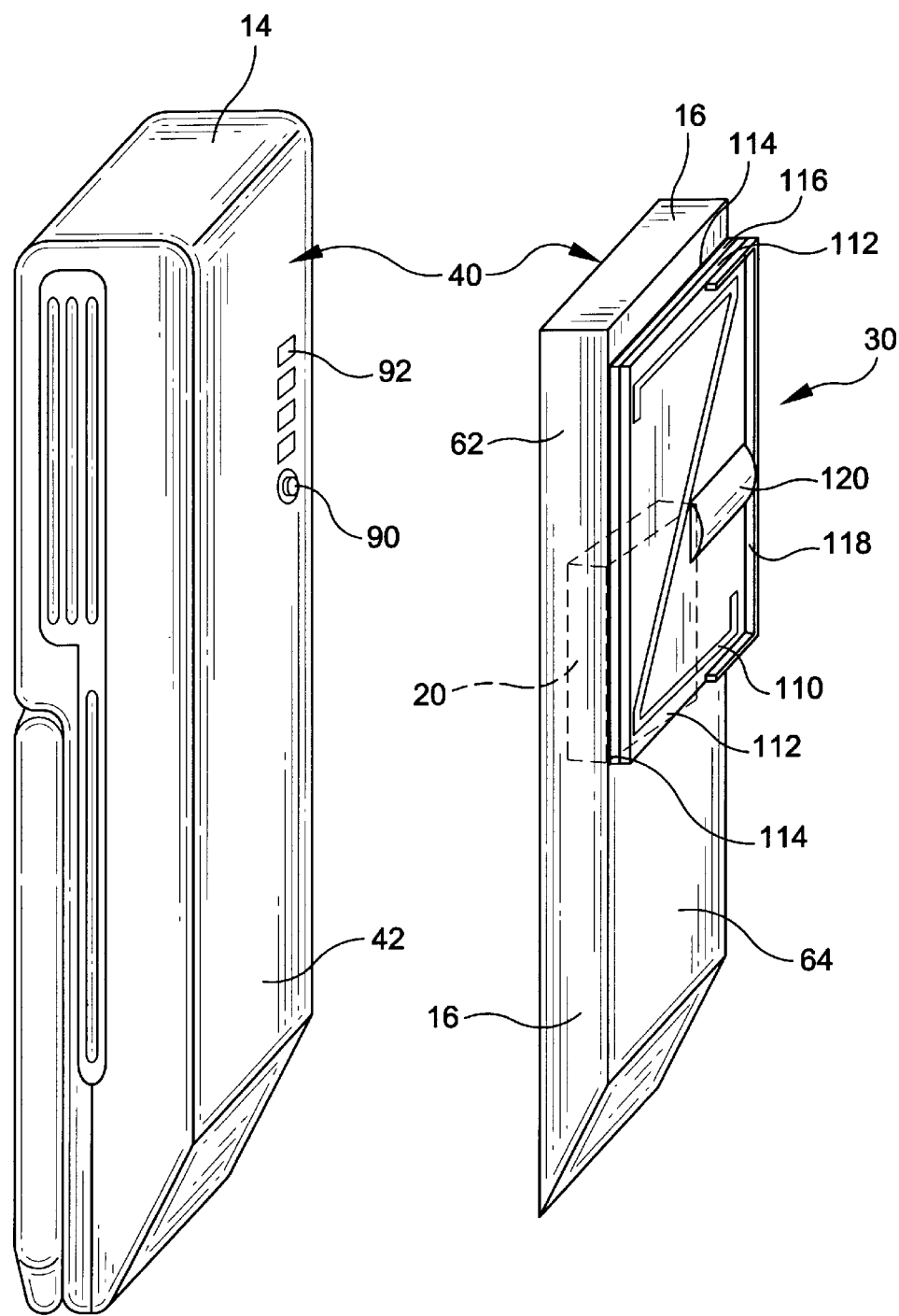
FIG. 3 is a perspective view of another embodiment of a wireless communication device according to the present invention, illustrating the combined battery and antenna assembly disassociated from the handset member.
Figure 4:
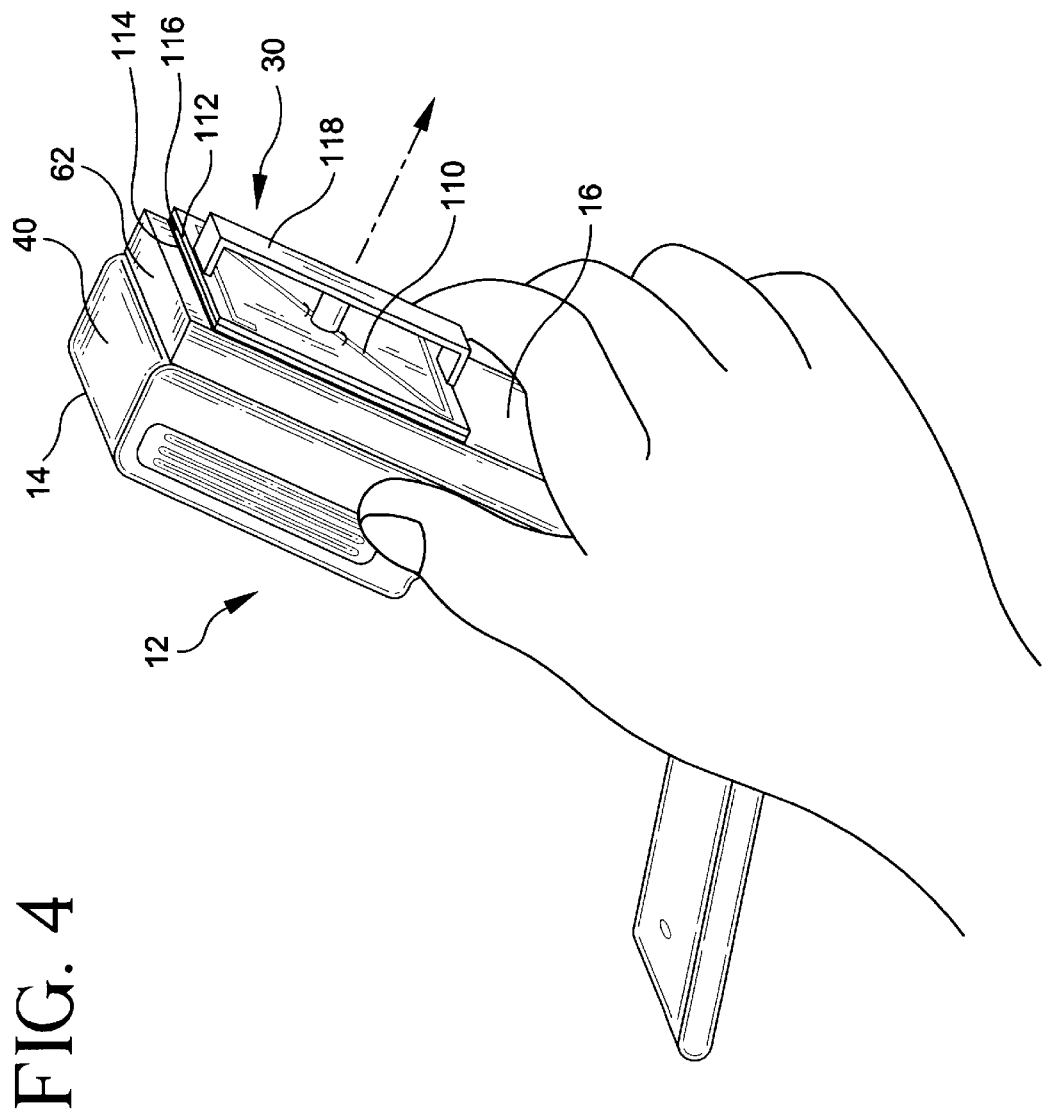
FIG. 4 is a perspective view of the wireless communication device of FIG. 3, illustrating the combined battery and antenna assembly operatively associated with the handset member.

Referring now to FIGS. 3 and 4, another embodiment of an antenna assembly 70 is illustrated. The antenna assembly 70 is disposed near the upper portion 62 of the detachable structure 16 of the wireless communication device 12. Coupling devices 90, 92 for operatively coupling the antenna 70 and battery 20 to the handset 14 include a coax connector 90 and plurality of contacts 92. Alternative coupling devices 90, 92 are readily appreciated by those skilled in the art. The battery assembly 20 is also disposed near the upper portion 62 of the detachable structure 16. The battery assembly 20 may be operatively coupled to the ground plane 92 of the wireless communication device 12 to enhance performance characteristics of the antenna 70. As illustrated in FIGS. 3 and 4, the battery assembly 20 is disposed between the antenna assembly 70 and the handset member 14. Alternatively, the battery assembly 20 may be disposed at the lower portion 64 or any intermediate portion of the detachable assembly 16.

Still referring to FIGS. 3, and 4, the antenna assembly 70 includes a serpentine, driven element 110 disposed upon a planar dielectric substrate member 112. The planar dielectric substrate 112 is disposed relative to a ground plane member 114, which may be a discrete conductive panel, a conductive coating on a portion of the detachable assembly 16, the battery assembly 20, or a combination thereof. Disposed between the dielectric substrate 112 and the ground plane member 114 is a radiation absorbing material 116. Additionally, the antenna assembly 70 includes a movable parasitic element 118. During an operational mode, as illustrated in FIG. 4, the parasitic element 118 is disposed a gap distance away from the driven element 110 by a movable support structure 120. The support structure 120, as depicted in FIG. 4, has been pivoted into a perpendicular orientation with respect to the driven element 110. The gap distance of the parasitic element 118 to the driven element 110 is selected to direct at least a portion of the radio signal into a transmission direction away from the user. The antenna assembly 70 may be housed within a protective cover (not shown) which may be integrated within or upon the detachable assembly 16. Antenna assembly 70 may further include a latch and spring structure (not shown) or other structure to retain the support structure 120 in the undeployed position (as shown in FIG. 3 ) or selectively permit the support structure 120 to pivot into the upright position of FIG. 4 during use of the wireless communication device 12.

Figure 5:
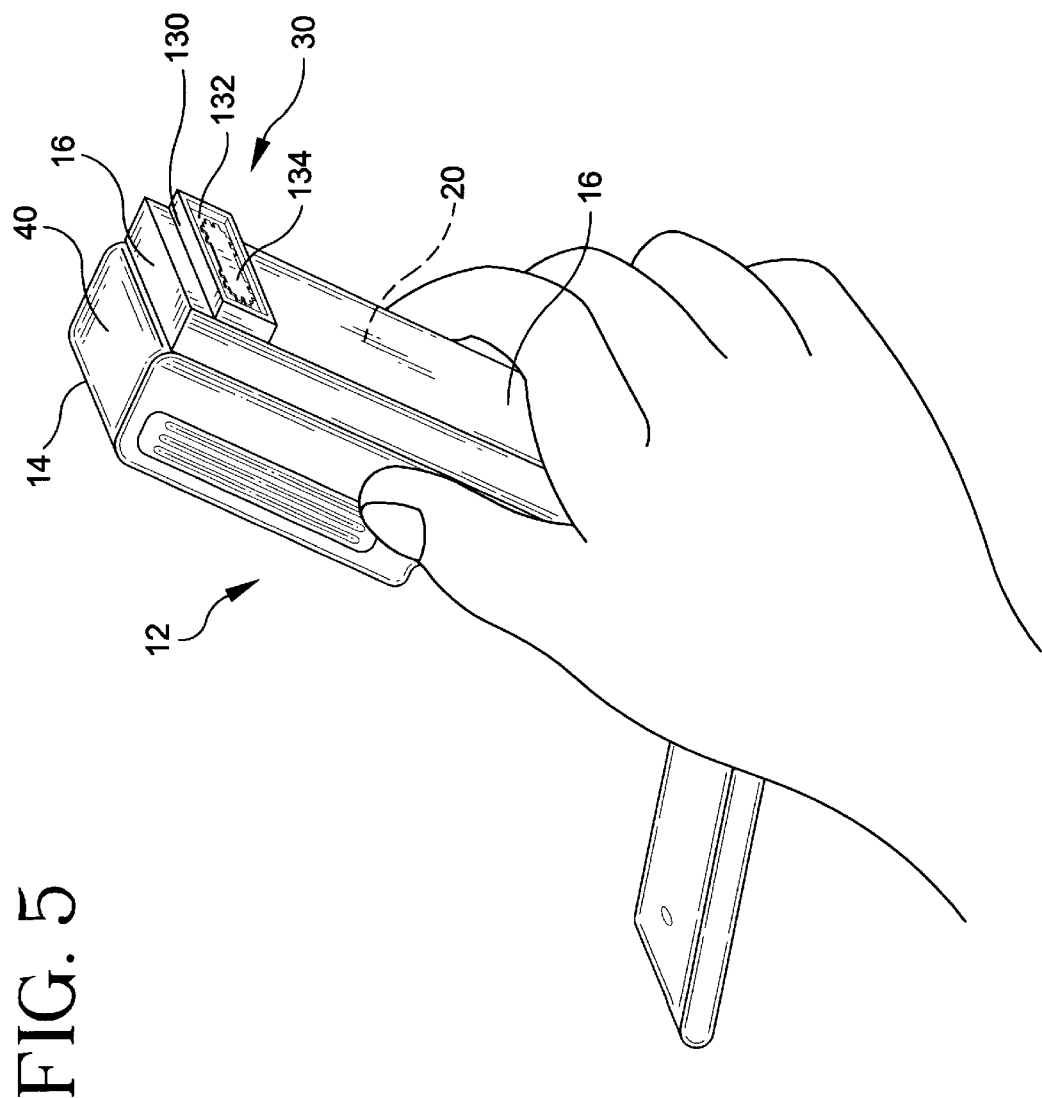
FIG. 5 is a perspective view of another embodiment of a wireless communication device according to the present invention, illustrating a patch-style antenna assembly.

Referring now to FIG. 5, another embodiment of the present invention is illustrated. The antenna assembly 70 of this embodiment includes a "patch" antenna 130 disposed near the upper portion 62 of the detachable structure 16. Patch antennas 130 are well known to those skilled in the art, and may include one or more dielectric substrate elements 132 and conductive layers 134 disposed thereon. A variety of patch antenna 130 styles may be practicably incorporated within the present invention. Selection of a particular patch antenna 130 for incorporation herein would be accomplished through known and readily appreciated engineering analyses.

Figure 6:
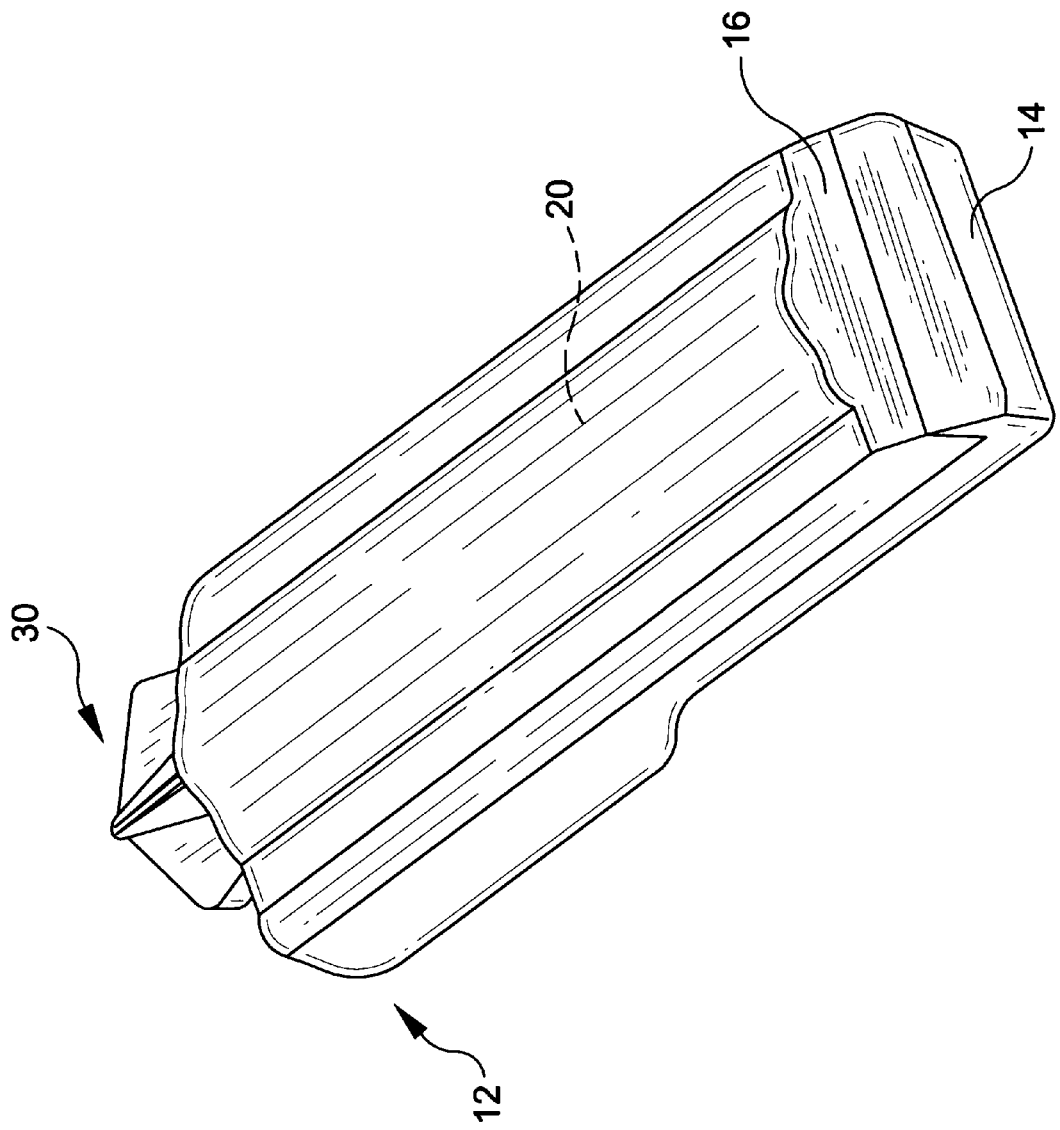
FIG. 6 is a perspective view of another embodiment of a wireless communication device according to the present invention, illustrating the combined battery and antenna assembly operatively associated with the handset member.
Figure 7:
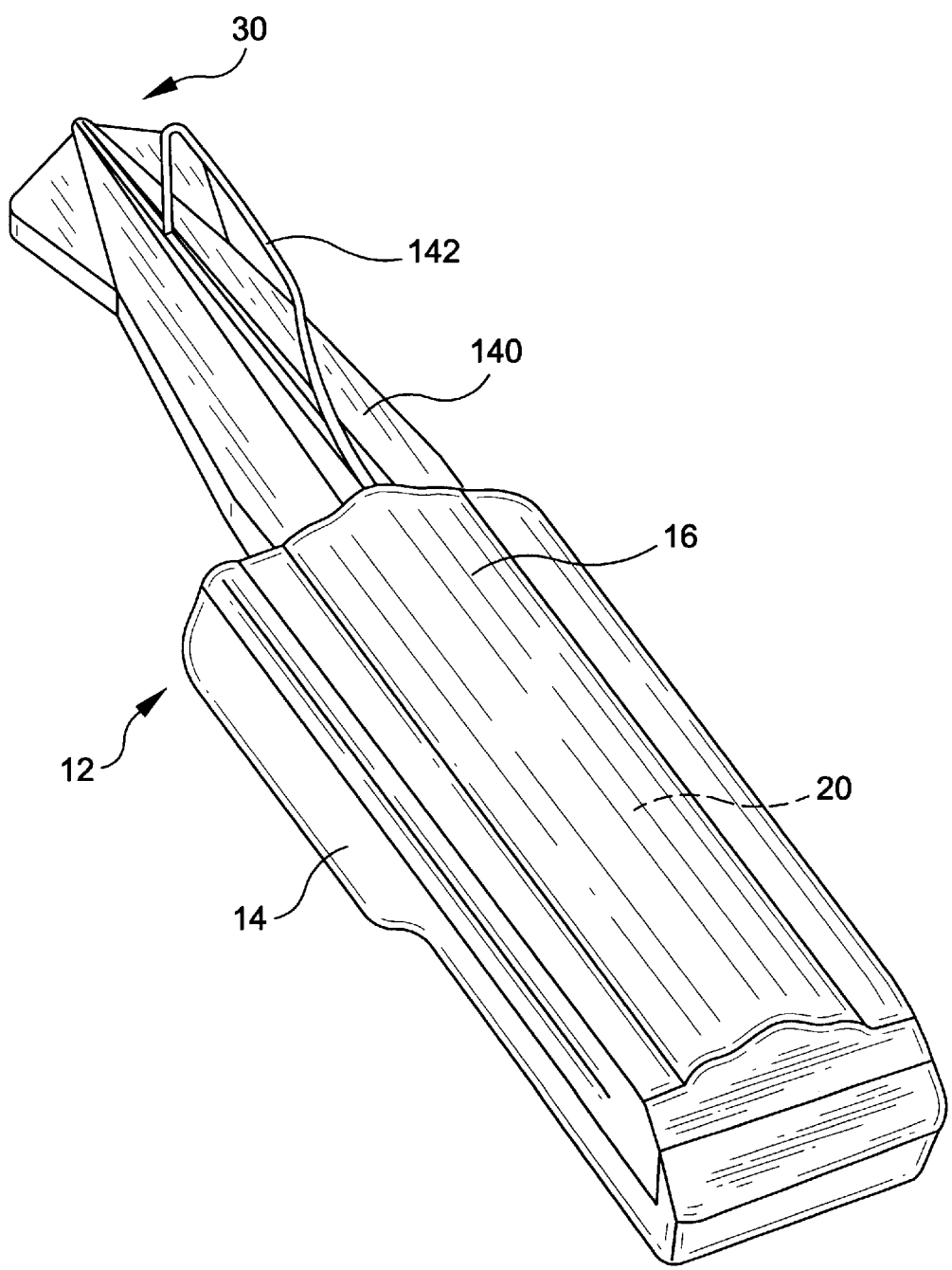
FIG. 7 is a perspective view of the wireless communication device of FIG. 6, illustrating an operational orientation of the antenna assembly.

With reference to FIGS. 6 and 7, still another embodiment of the present invention is illustrated The antenna assembly 70 includes a slidably-received element 140. The sliding element 140 may include an elongated driven element 142 aligned parallel with the wireless communication device's longitudinal axis. The sliding element 140 is depicted in FIG. 6 in an undeployed orientation, and in FIG. 7 in a deployed (operational) orientation. The sliding element 140 may be received into an interior cavity of the detachable structure 16. The sliding element 140 may be biased into the operational orientation of FIG. 6 upon a user manipulation of a release tab or switch (not shown). For instance, the sliding element 140 may be spring biased into its deployed orientation by user contact of an activation device. The battery assembly 20 associated with the detachable assembly 16 may be disposed at the lower, intermediate, or upper portion thereof.

Figure 8:
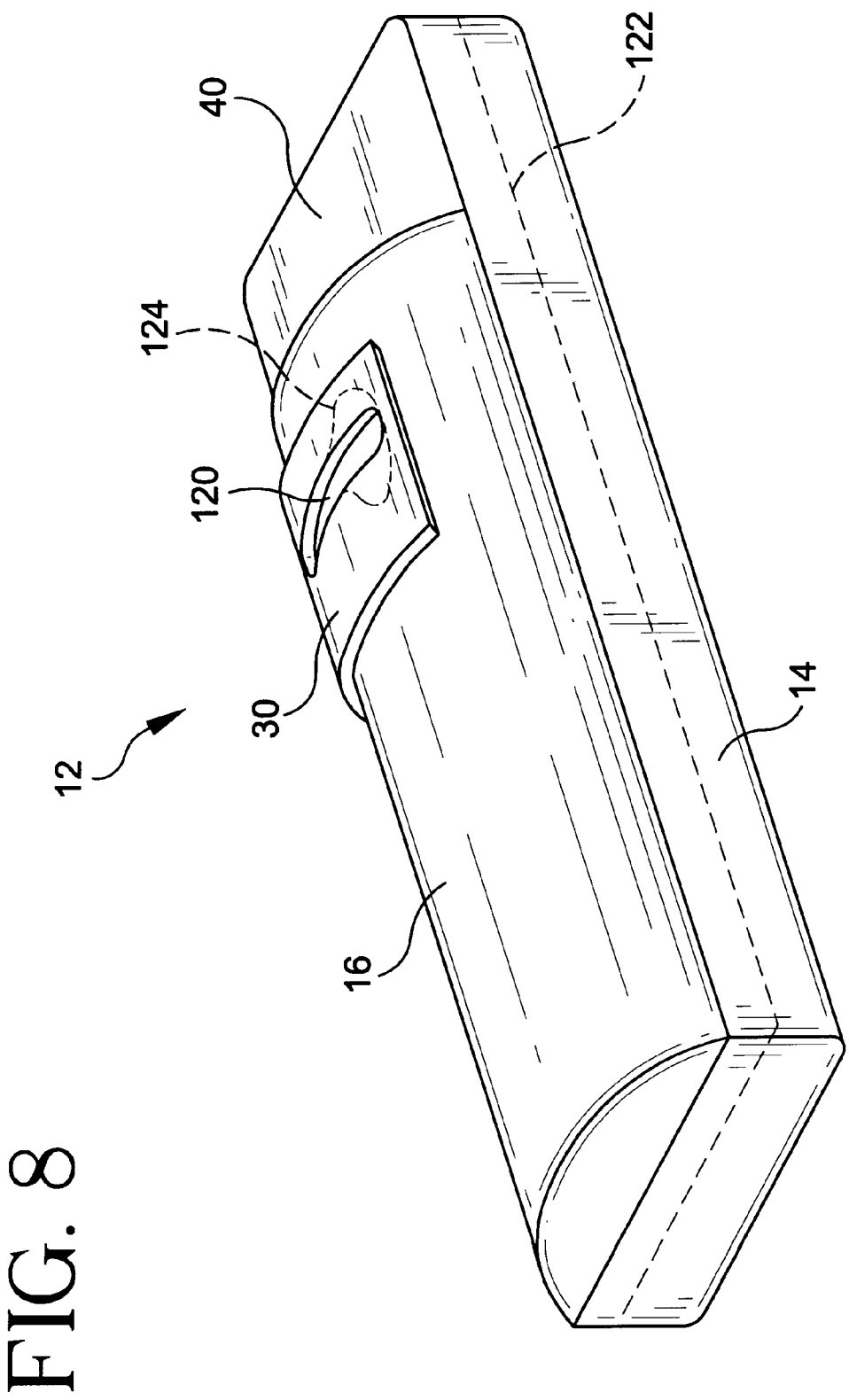
FIG. 8 is a perspective view of another embodiment of a wireless communication device according to the present invention, illustrating a slot antenna assembly.

Referring now to FIG. 8, another embodiment of a wireless communication device 12 is illustrated. The antenna assembly 70 includes a slot antenna 120 displaced away from a ground plane member 122. The slot antenna 120 is disposed near the upper portion of the wireless communication device 12, and away from a user's hand during intended operation of the device 12. The slot antenna may be a thin conductive element diposed upon and conforming to a surface of the detachable assembly 16. A variety of slot configurations and designs are appreciated by those skilled in the art. Another example of a slot is shown in phantom on FIG. 8, as numeral 124. Particular slot antenna assemblies for telecommunication devices are disclosed in U.S. patent application, Ser. No. 09/008,618, (filed Jan. 16, 1998) to Johnson, inventor herein, and incorporated herein in its entirety.

A method of use according to the present invention may include a process of the following steps: obtaining a phoneset member 14; obtaining a plurality of detachable structures 16 capable of being attached to the phoneset member 14, wherein each of the plurality of detachable structures 16 has a different antenna structure 70 (for instance, whip, planar, patch, directive, etc.); individually attaching and testing for transmission characteristics the phoneset member 14 with each of the plurality of detachable structures 16; and selecting one of the plurality of detachable structures 16 to optimize a performance characteristic of the phoneset.

Still other uses of the present may include a kit assembly of a phoneset member 14 and a plurality of detachable structures 16, each having a different antenna assembly 70, wherein the user may select from among the plurality of detachable structures 16 for an antenna optimized to a particular application. For instance, a kit assembly may include two detachable assemblies 16 having two different antenna assemblies 70, each antenna assembly 70 intended for a different frequency range. The user could then selectively attach the desired detachable assembly 16 depending on the desired operational frequency.

The above described embodiments of the invention are merely descriptive of its principles and are not to be considered limiting. Further modifications of the invention herein disclosed will occur to those skilled in the respective arts and all such modifications are deemed to be within the scope of the invention as defined by the following claims.

What is claimed:

1. A removable assembly for use with a hand-held communication device, said communication device for use by a user for transmitting a radio signal, said removable assembly comprising:

a body member which is adapted to be releasably secured to the communication device, said body member having an exterior surface, and having an upper portion and a lower portion;

a battery component disposed upon said body member for powering the communication device;

an antenna structure disposed upon the exterior surface of the body member, said antenna structure disposed at the upper portion of the body member, said antenna structure including a driven element for transmitting the radio signal of the communication device; and a coupling device for operatively coupling the battery component and the antenna structure to the communication device.

2. A removable assembly according to claim 1, wherein the battery component includes a plurality of batteries disposed proximate the lower portion of the body member.

3. A removable assembly according to claim 1, wherein the antenna structure is a slot antenna structure.

4. A removable assembly according to claim 1, wherein the coupling device includes a separate DC coupling device and a RF coupling device.

5. A removable assembly according to claim 1, wherein the antenna structure is disposed away from a user's hand during intended operation of the communication device.

6. A removable assembly according to claim 1, wherein the battery component is disposed proximate the lower portion of the body member.

7. An assembly for a hand-held communication device, said assembly comprising:

a body member, said body member having an interior region and an exterior surface, and having an upper portion and a lower portion;

an attachment structure for selectively securing the body member to the communication device, said attachment structure permitting selective detachment of the body member to the communication device;

an antenna structure disposed upon the exterior surface of the body member proximate said upper portion;

a rechargeable battery pack assembly disposed within the interior region of the body member;

a battery pack coupling device for operatively coupling the battery pack assembly to the communication device during the use; and an antenna structure coupling device for operatively coupling the antenna structure to the communication device during the use.

8. An assembly according to claim 7, wherein the rechargeable battery pack assembly is disposed away from the antenna structure.

9. An assembly according to claim 7, wherein the rechargeable battery pack assembly is disposed proximate the lower portion of the body member.

10. An assembly according to claim 7, further comprising:
a radiation absorbing material disposed upon the body member between the antenna structure and the communication device.

11. A removable battery pack assembly for a hand-held wireless communication device, said removable battery pack assembly having an exterior surface, said removable battery pack assembly comprising:
at least one rechargeable battery for powering the wireless communication device;
an antenna structure for emitting a radio frequency signal generated by the wireless communication device said antenna structure disposed upon the exterior surface of the battery pack assembly proximate an upper portion thereof and away from a user's hand during intended operation of the communication device; and
a coupling device for operatively coupling the at least one rechargeable battery and the antenna structure with the wireless communication device.

12. A removable battery pack assembly according to claim 11, wherein the antenna structure is disposed away from the at least one rechargeable battery.

13. A removable battery pack assembly according to claim 12, wherein the at least one rechargeable battery is disposed proximate a lower portion of the removable battery pack assembly.

14. A removable battery pack assembly according to claim 11, further comprising:
a radiation absorbing material disposed between the antenna structure and a user of the communication device.

15. A removable assembly for a hand-held wireless communication device, said removable assembly having an exterior surface, said removable assembly comprising:
at least one rechargeable battery disposed upon the removable assembly at a first location, said at least one rechargeable battery for powering the communication device;
an antenna structure for emitting a radio frequency signal generated by the communication device said antenna structure disposed upon the exterior surface of the removable assembly at a second location proximate an upper portion of the communication device; and a coupling device for operatively coupling the at least one rechargeable battery and the antenna structure with the communication device.

16. A removable assembly according to claim 15, wherein the antenna structure includes a displaceable active antenna element supported upon a movable support element.

17. A removable assembly according to claim 15, wherein the antenna structure is a slot antenna structure.

18. A removable assembly according to claim 15, wherein the coupling device includes a DC coupling structure and a separate RF coupling structure.

19. A removable assembly according to claim 15, wherein the first location is disposed proximate a lower portion of the removable assembly.

20. A removable assembly according to claim 15, wherein the antenna structure is disposed away from a user's hand during intended operation of the communication device.

21. A removable assembly for a hand-held wireless communication device having a direction of maximum signal propagation directed away from a user thereof, said removable assembly having an exterior surface, said removable assembly comprising:
at least one rechargeable battery disposed upon the removable assembly, said at least one rechargeable battery for powering the communication device;
a directional antenna structure for emitting a radio frequency signal generated by the communication device in the direction of maximum signal propagation, said directional antenna structure disposed upon the exterior surface of the removable assembly away from the at least one rechargeable battery in the direction of maximum signal propagation, whereby the at least one rechargeable battery is disposed between the antenna structure and the user thereof; and
a coupling device for operatively coupling the at least one rechargeable battery and the antenna structure with the communication device.

22. A removable assembly for a hand-held wireless communication device according to claim 21, wherein the directional antenna structure is disposed proximate an upper portion of the communication device.

23. A removable assembly for a hand-held wireless communication device according to claim 21, wherein the at least one rechargeable battery is disposed proximate a lower portion of the communication device.

24. A removable assembly for a hand-held wireless communication device according to claim 21, further comprising:
a radiation absorbing material disposed between the directional antenna structure and a user of the communication device.

* * * * *